(12) United States Patent
Peng et al.

(10) Patent No.: US 12,199,880 B2
(45) Date of Patent: Jan. 14, 2025

(54) TRAFFIC SCHEDULING METHOD AND SYSTEM, AND STORAGE MEDIUM

(71) Applicant: ZTE CORPORATION, Shenzhen (CN)

(72) Inventors: Shaofu Peng, Shenzhen (CN); Xiaowei Ji, Shenzhen (CN); Yong Qian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/275,319

(22) PCT Filed: Apr. 15, 2022

(86) PCT No.: PCT/CN2022/087240
§ 371 (c)(1),
(2) Date: Aug. 1, 2023

(87) PCT Pub. No.: WO2022/233227
PCT Pub. Date: Nov. 10, 2022

(65) Prior Publication Data
US 2024/0129246 A1    Apr. 18, 2024

(30) Foreign Application Priority Data

May 6, 2021   (CN) .......................... 202110492208.X (51) Int. Cl.
*G06F 15/173* (2006.01)
*H04L 45/02* (2022.01)
(Continued)

(52) U.S. Cl.
CPC .......... *H04L 47/2433* (2013.01); *H04L 45/02* (2013.01); *H04L 45/30* (2013.01); *H04L 47/11* (2013.01)

(58) Field of Classification Search
CPC ....... H04L 47/2433; H04L 47/11; H04L 45/02
See application file for complete search history.

(56) References Cited

U.S. PATENT DOCUMENTS

2020/0322264 A1    10/2020   Clad et al.

FOREIGN PATENT DOCUMENTS

| CN | 110944357 A | 3/2020 |
|---|---|---|
| CN | 112291147 A1 | 1/2021 |

(Continued)

OTHER PUBLICATIONS

The international search report of the corresponding PCT Application No. PCT/CN2022/087240 mailed on Jul. 18, 2022 along with English translation thereof.

*Primary Examiner* — Joseph R Maniwang
(74) *Attorney, Agent, or Firm* — NZ CARR LAW OFFICE (57) ABSTRACT

Disclosed in embodiments of the present application are a traffic scheduling method, a system, and a storage medium. In the present application, a controller acquires the utilization rate of preset resources in a network, then determines, according to the utilization rate, the load state of each service node on a first SR-TE path having the highest scheduling priority in a pre-created SR-TE path scheduling group, when there is an overloaded service node on the first SR-TE path, determines a second SR-TE path according to the first SR-TE path, sets the scheduling priority of the second SR-TE path to the highest scheduling priority, sets the scheduling priority of the first SR-TE path to a normal scheduling priority, and obtains an updated SR-TE path scheduling group, and finally delivers the updated SR-TE path scheduling group to a headend node on the network.

17 Claims, 4 Drawing Sheets

(51) Int. Cl.
*H04L 45/30* (2022.01)
*H04L 47/11* (2022.01)
*H04L 47/2425* (2022.01)

(56) References Cited

FOREIGN PATENT DOCUMENTS

| | | |
|---|---|---|
| CN | 112422427 A | 2/2021 |
| CN | 112422430 A | 2/2021 |

TRAFFIC SCHEDULING METHOD AND SYSTEM, AND STORAGE MEDIUM

CROSS REFERENCE TO RELATED APPLICATIONS

This application is based upon and claims priority to Chinese Patent Application No. 202110492208.X, filed on May 6, 2021, the entire contents of which are incorporated herein by reference.

TECHNICAL FIELD

Embodiments of the present application relate to the field of mobile communication, in particular to a traffic scheduling method and system, and a storage medium.

BACKGROUND

With the development and popularization of 5G, a demand for edge computational power will significantly increase. Edge computing and cloud computing cooperate with each other to enable digital transformation of the industry. Specifically, by focusing on the analysis of non-real-time and long-term data through cloud computing, it can excel in fields such as periodic maintenance and service decision support; and by focusing on the analysis of real-time and short-term data through edge computing, it can better support real-time and intelligent processing and execution of local services. Combining with the trend of cloud-edge-end ubiquitous distribution in future computing forms, the integration of computing and networks will be closer. Due to the limited computing power of individual nodes, large-scale computing services often need to be implemented through computing networking, known as a "computational power network". The computational power network requires a high degree of cooperation between the network and computing, a computing unit and computing capabilities are embedded into the network, and a utilization rate of computing resources is increased. In the computational power network, a user accesses the network through computational power gateways, device nodes comprehensively consider the real-time network and computing resource conditions according to demands of application services, and schedule different applications to appropriate computing nodes for processing to ensure service experience.

Segment routing (SR) is a source routing protocol, also known as a segment routing protocol. A source node (also known as a headend node, commonly referred to as the headend node in this article) specifies a path for a data packet in the network, encodes a service path into an ordered segment list through a specific algorithm, packages it to a header of the data packet to display an identifier path, and forwards nodes on the path without maintaining state information for all possible flows that may pass through the nodes, that is, "the state is in the data packet". Since instructions are encoded in the header of the data packet, after receiving the data packet, the nodes in the network match and forward a table executing operation, and an intermediate node of the path only needs to forward according to the specified path in the corresponding header of the data packet. Based on these characteristics of segment routing, the current segment routing traffic engineering (SR-TE) has more advantages than traditional resource reservation protocol traffic engineering (RSVP-TE), and can be better applied to the existing "computational power network", such as a software defined network (SDN).

However, during traffic scheduling of the current SR-TE, once a path with a highest priority is determined, all traffic can only be scheduled through that path in the whole traffic scheduling process, regardless of any changes in resources in the network. The whole traffic scheduling process does not consider changes in the utilization rate of various resources in the network, nor does it consider the load of nodes forwarding the data packet in the network. Alternatively, during traffic scheduling, it can be mapped to one SR-TE path with the same priority in a group of SR-TE paths according to the priority of packets. However, the same problem is that this traffic can only be scheduled through the mapped path, and the whole traffic scheduling process does not consider the changes in the utilization rate of various resources in the network.

SUMMARY

An embodiment of the present application provides a traffic scheduling method, applied to a controller, and including: acquiring a utilization rate of preset resources in a network; determining, according to the utilization rate, a load state of each service node on a first segment routing traffic engineering (SR-TE) path having a highest scheduling priority in a pre-created SR-TE path scheduling group; determining, if it is determined that an overloaded service node exists on the first SR-TE path according to the load state of each service node, a second SR-TE path according to the first SR-TE path, setting a scheduling priority of the second SR-TE path to a highest scheduling priority, setting a scheduling priority of the first SR-TE path to a normal scheduling priority, and obtaining an updated SR-TE path scheduling group; and delivering the updated SR-TE path scheduling group to a headend node on the network, such that in a case of receiving a service flow that needs to be scheduled, the headend node guides a first service flow that meets a preset condition to the first SR-TE path, guides a second service flow that meets the preset condition to the second SR-TE path, and maintains a mapping relationship between the first service flow and the first SR-TE path, and between the second service flow and the second SR-TE path. The first service flow is a service flow that is guided to the first SR-TE path before the second SR-TE path is created, and the second service flow is a new service flow received by the headend node after the second SR-TE path is created.

An embodiment of the present application further provides a traffic scheduling method, applied to a headend node, and including: receiving a segment routing traffic engineering (SR-TE) path scheduling group delivered by a controller, where the SR-TE path scheduling group at least includes one SR-TE path with a scheduling priority being a highest scheduling priority; matching, in a case of receiving a service flow that needs to be scheduled, service flows that meet a preset condition; guiding, if the SR-TE path scheduling group only includes one SR-TE path with the scheduling priority being the highest scheduling priority, the matched service flows to the SR-TE path with the scheduling priority being the highest scheduling priority, and maintaining a mapping relationship between the service flows and the SR-TE path; and otherwise, guiding, according to feature information of the matched service flows that meet the preset condition and the scheduling priority corresponding to each SR-TE path in the SR-TE path scheduling group, the service flows that meet the preset condition to the matched SR-TE path.

An embodiment of the present application further provides a traffic scheduling system, including a controller and a headend node; the controller acquires a utilization rate of preset resources in a network; the controller determines, according to the utilization rate, a load state of each service node on a first SR-TE path having a highest scheduling priority in a pre-created SR-TE path scheduling group; the controller determines, if it is determined that an overloaded service node exists on the first SR-TE path according to the load state of each service node, a second SR-TE path according to the first SR-TE path, sets a scheduling priority of the second SR-TE path to a highest scheduling priority, sets a scheduling priority of the first SR-TE path to a normal scheduling priority, and obtains an updated SR-TE path scheduling group; the controller delivers the updated SR-TE path scheduling group to the headend node; and in a case of receiving a service flow that needs to be scheduled, the headend node guides a first service flow that meets a preset condition to the first SR-TE path, guides a second service flow that meets the preset condition to the second SR-TE path, and maintains a mapping relationship between the first service flow and the first SR-TE path, and between the second service flow and the second SR-TE path. The first service flow is a service flow that is guided to the first SR-TE path before the second SR-TE path is created, and the second service flow is a new service flow received by the headend node after the second SR-TE path is created.

An embodiment of the present application further provides a computer readable storage medium, storing a computer program. The computer program, when executed by a processor, implements any above traffic scheduling method.

BRIEF DESCRIPTION OF THE DRAWINGS

One or more embodiments are exemplified through images in accompanying drawings corresponding to the embodiments, and these exemplary descriptions do not constitute a limitation to the embodiments.

DETAILED DESCRIPTION

The term "and/or" in embodiments of the present application describes an association relationship of associated objects, which means that there may be three relationships, for example, A and/or B, which may represent three cases: the existence of A alone, the simultaneous existence of A and B, and the existence of B alone. The character "/" universally indicates that the associated objects are in an "or" relationship.

The term "a plurality of" in the embodiments of the present application means two or more, and other quantifiers are similar to it.

In order to make objectives, technical solutions and advantages of the embodiments of the present application clearer, the embodiments of the present application will be described in detail below with reference to accompanying drawings. However, those ordinarily skilled in the art may understand that in the embodiments of the present application, many technical details are proposed to enable readers to better understand the present application. However, even without these technical details and various changes and modifications based on the following embodiments, the technical solutions required for protection in the present application may still be realized. The division of the following embodiments is for convenience in description and should not constitute any limitations to specific implementations of the present application, and all the embodiments may be combined and referred with one another without contradiction.

An objective of embodiments of the present application is to provide a traffic scheduling method and system, and a storage medium, aiming to perform dynamic traffic scheduling according to dynamically changing network resources and the load of nodes forwarding a data packet in a network, so that the quality of service can be better improved.

According to the traffic scheduling method and system, and the storage medium provided by the embodiments of the present application, in order to ensure the balance of resources in the network and the load balance of the service nodes that provide service functions, the controller is arranged to acquire the utilization rate of the preset resources in the network, then determine, according to the utilization rate, the load state of each service node on the first SR-TE path having the highest scheduling priority in the pre-created SR-TE path scheduling group, when there is the overloaded service node on the first SR-TE path, determine the second SR-TE path according to the first SR-TE path, set the scheduling priority of the second SR-TE path to the highest scheduling priority, and set the scheduling priority of the first SR-TE path to the normal scheduling priority, so that there are a plurality of available SR-TE paths in the updated SR-TE path scheduling group, and finally deliver the updated SR-TE path scheduling group to the headend node on the network, the headend node is arranged to continue to guide, when receiving the service flow that needs to be scheduled, and before creating the second SR-TE path, the service flow that has been guided to the first SR-TE path to the first SR-TE path, guide the new service flow received by the headend node after creating the second SR-TE path to the second SR-TE path, and maintain the mapping relationship between the first service flow and the first SR-TE path, and between the second service flow and the second SR-TE path, so that the SR-TE paths can be selected according to actual demands, that is, dynamic traffic scheduling is realized, and then the quality of service is better improved.

Figure 1:
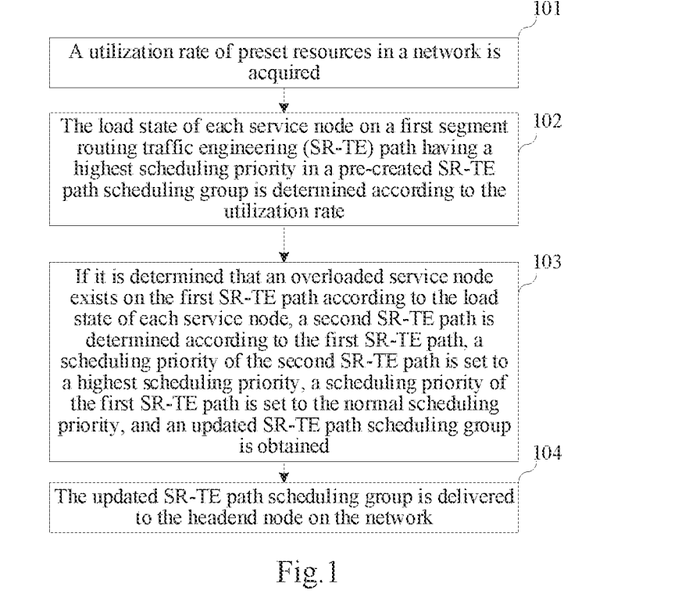
FIG. 1 is a flowchart of a traffic scheduling method applied to a controller and provided by an embodiment of the present application.

Referring to FIG. 1, FIG. 1 is a flowchart of a traffic scheduling method provided by an embodiment of the present application, and in the embodiment, the method is mainly applied to a controller.

Understandably, in an example, the controller may be a centralized controller, that is, one controller may control a plurality of headend nodes on a network.

In addition, the headend node in the embodiment specifically refers to an edge device which is located at a core network layer and is commonly referred to as a provider edge (PE), such as an edge router of a backbone network of a service provider.

In the embodiment, the headend node on the network is equivalent to a label edge router (LER, also known as an edge LSR), which is used for connecting a customer edge (CE) and a carrier network backbone router (P router).

In an example, the CE router sends traffic (traffic in a service flow) that a connected user device needs to forward to the PE router, and the traffic flows into a user network through the PE router, or flows to an Internet protocol (IP) backbone network or a multi-protocol label switching (MPLS) backbone network.

In addition, it is worth mentioning that in an example, the CE router mentioned above provides service access for users by connecting one or more PE routers.

In the embodiment, in an example, the CE router may be an Internet protocol router, which establishes an adjacency relationship with the connected PE router, so that the traffic that the user needs to forward can flow into the user network through the adjacency PE router, or flow into the IP/MPLS backbone network.

As for relevant working principles of the CE router, the PE router and the P router mentioned above, those skilled in the art may refer to relevant materials on their own, which will not be repeated in the embodiment.

As shown in FIG. 1, the traffic scheduling method provided by the embodiment includes the following steps:

step 101, a utilization rate of preset resources in a network is acquired.

In the embodiment, in a case that the traffic of the user flows into the network through the PE router, namely the headend node mentioned in the embodiment, it will cause a change in the utilization rate of resources on service nodes for providing service functions in the network. Therefore, in order to realize the load balance of the service nodes for providing the service functions to better provide services, in an embodiment, the preset resources that affect a load state of the service nodes may be pre-determined, and then according to the determined preset resources, the utilization rate of the preset resources is collected in different time periods or according to a preset cycle.

Step 102, the load state of each service node on a first segment routing traffic engineering (SR-TE) path having a highest scheduling priority in a pre-created SR-TE path scheduling group is determined according to the utilization rate.

It should be noted that in an example, if the SR-TE path is a segment routing tunnel path (hereinafter referred to as an SR-TE tunnel), the pre-created SR-TE path scheduling group is formed by a plurality of SR-TE tunnels; if the SR-TE path is a segment routing traffic engineering policy path (hereinafter referred to as an SR-TE policy), the pre-created SR-TE path scheduling group is formed by a plurality of SR-TE policies; if the SR-TE path is a sub-path in the SR-TE tunnel, the pre-created SR-TE path scheduling group is essentially an SR-TE tunnel; if the SR-TE path is a candidate path in the SR-TE policy, the pre-created SR-TE path scheduling group is essentially an SR-TE policy; and if the SR-TE path is a segment list in a candidate path in an SR-TE policy, the pre-created SR-TE path scheduling group is essentially the candidate path.

In addition, in another example, the SR-TE paths included in the SR-TE path scheduling group may further be a combination of the SR-TE tunnel and the SR-TE policy.

In addition, it should be noted that the highest scheduling priority mentioned in the embodiment, as well as a subsequent normal scheduling priority, are not the same as priority attributes defined for the SR-TE paths currently. Although they are all priorities, the priority attributes set for the SR-TE paths currently specifically refer to the SR-TE path with the highest priority in order to take effect and forward the service flows. That is, if the existing priority attributes are adopted to configure the priorities for the SR-TE paths in the SR-TE path scheduling group, only one SR-TE path is available, and other SR-TE paths in the SR-TE path scheduling group cannot be used. In the embodiment, all SR-TE paths in the SR-TE path scheduling group may be used, except that the SR-TE path having the highest scheduling priority may correspond to a newly received service flow, while the old service flows generally may correspond to the SR-TE paths having the normal scheduling priorities. In some cases, the old service flows may also correspond to the SR-TE path having the highest scheduling priority, for example, the scheduling priorities of the SR-TE paths to which the old service flows are mapped before have changed.

In order to distinguish whether the SR-TE path in the SR-TE path scheduling group has the highest scheduling priority or the normal scheduling priority, in an embodiment, an on-off flag may be used, such as setting on to have the highest scheduling priority and off to have the normal scheduling priority; numerical values may further be used to compare magnitude, such as the larger being the highest scheduling priority or the smaller being the highest scheduling priority; a timestamp may further be used, such as the newer being the highest scheduling priority; and a sequence number may further be used, such as increasing of the sequence number or the larger being the highest scheduling priority.

It should be understood that the above examples are only listed for a better understanding of the technical solutions of the embodiment, and are not the only limitation to the embodiment.

Step 103, if it is determined that an overloaded service node exists on the first SR-TE path according to the load state of each service node, a second SR-TE path is determined according to the first SR-TE path, a scheduling priority of the second SR-TE path is set to a highest scheduling priority, a scheduling priority of the first SR-TE path is set to the normal scheduling priority, and an updated SR-TE path scheduling group is obtained.

As for the mode of determining the second SR-TE path according to the first SR-TE path, in an example, it may be that a new SR-TE path that can meet the same user demand is created as the second SR-TE path. In another example, it may be that an existing SR-TE path is selected from the SR-TE path scheduling group as the second SR-TE path.

In the embodiment, in order to ensure that the SR-TE paths in the same SR-TE path scheduling group provide the same service functions, and the headend node and a destination node are the same, in a case of determining the second SR-TE path according to the first SR-TE path, specifically, the user demand corresponding to the first SR-TE path may be acquired, then a new SR-TE path from the headend node to the destination node is created according to the same user demand as the second SR-TE path, that is, a new SR-TE path that can meet the same user demand is created as the second SR-TE path.

For a better understanding, the embodiment provides a specific mode for creating a new second SR-TE path:

(1) according to the first SR-TE path, determining the headend node and the destination node of the second SR-TE path that needs to be created, and constraint conditions that a path to be calculated needs to meet, such as containing an ordered service function list, and selecting a link with a specific bandwidth or a low latency link, which will not be listed one by one here, and it is not limited in the embodiment.

(2) calculating and creating the second SR-TE path.

The created new second SR-TE path and the first SR-TE path are specific to the same user demand.

It should be understood that in a specific implementation, the nodes or links contained in the second SR-TE path and the first SR-TE path are not necessarily related, they may happen to have some intersecting nodes or links, or they may not intersect at all.

In addition, in an example, there may be a plurality of SR-TE paths in the pre-created SR-TE path scheduling group, that is, in addition to the first SR-TE path having the highest scheduling priority, the pre-created SR-TE path scheduling group may further include a plurality of SR-TE paths having the normal scheduling priorities. In order to distinguish them from the first SR-TE path and the second SR-TE path mentioned above, they are hereinafter referred to as third SR-TE paths, that is, the third SR-TE paths are the SR-TE paths, except for the first SR-TE path, in the pre-created SR-TE path scheduling group.

Correspondingly, after executing steps (1) and (2), if the creation of the second SR-TE path fails, whether there is a suitable third SR-TE path may be searched in the SR-TE path scheduling group.

In the embodiment, if it is determined that there is no overloaded service node on the third SR-TE path according to the load state of each service node on the third SR-TE path, that is, the processing capacity of each service node is still available, the third SR-TE path is determined as the second SR-TE path having the highest scheduling priority; otherwise, no processing is taken.

It is worth mentioning that as for whether to decide to re-determine the second SR-TE path with the scheduling priority being the highest scheduling priority according to a change rate of the preset resources in the network, triggering conditions may be determined according to service demands in advance, and the triggering conditions are configured locally in the controller.

In addition, in another example, in a case that the headend node requests path calculation to the controller, it may explicitly inform the controller to determine the new second SR-TE path having the highest scheduling priority for the SR-TE path scheduling group according to the change rate of the preset resources in the network.

From the above description, it can be seen that the first SR-TE path in the updated SR-TE path scheduling group no longer has the highest scheduling priority compared to the second SR-TE path, but instead has the same normal scheduling priority as the third SR-TE path.

Step 104, the updated SR-TE path scheduling group is delivered to the headend node on the network.

In the embodiment, in an example, in a case that the controller delivers the updated SR-TE path scheduling group to the headend node on the network, the SR-TE paths in the SR-TE path scheduling group may be delivered to the headend node respectively, for example, the SR-TE path scheduling group is traversed, and traversed SR-TE paths are delivered to the headend node until all SR-TE paths in the SR-TE path scheduling group are delivered to the headend node.

In addition, in another example, in a case that the controller delivers the updated SR-TE path scheduling group to the headend node on the network, the SR-TE path scheduling group may further be directly delivered to the headend node as a whole, for example, the SR-TE path scheduling group may be packaged according to a preset format, then the packaged SR-TE path scheduling group is directly delivered to the headend node, and after receiving the packaged SR-TE path scheduling group, the headend node unpackages it according to an agreed unpackaging method, so as to obtain the SR-TE path scheduling group at least including the first SR-TE path and the second SR-TE path mentioned above.

In addition, in another example, in order to ensure that the headend node can know which SR-TE paths belong to the same SR-TE path scheduling group to manage them in a unit of group, so as to quickly distinguish the SR-TE paths in which SR-TE path scheduling group can adapt to which type of user demands and service scenarios to better provide high-quality services.

Before executing above step 104, the same path scheduling group identifier may be allocated to each SR-TE path in the SR-TE path scheduling group, such that the headend node can manage the received SR-TE paths according to the path scheduling group identifier, so that it can quickly distinguish the SR-TE paths in which SR-TE path scheduling group can adapt to which type of user demands and service scenarios to provide the high-quality services.

In addition, it should be noted that after the controller delivers the updated SR-TE path scheduling group, namely the SR-TE path scheduling group at least including a first SR-TE path and a second SR-TE path, to the headend node, the headend node may directly match, in a case of receiving a service flow that needs to be scheduled (it may also be understood as traffic that needs to be scheduled), a first service flow and a second service flow that meet a preset condition from the received service flows according to the preset condition, such as "all packets to a destination IP being server1-IP", guides the first service flow that meets the preset condition to the first SR-TE path mentioned above, guides the second service flow that meets the preset condition to the second SR-TE path mentioned above, and maintains a mapping relationship between the first service flow and the first SR-TE path, and between the second service flow and the second SR-TE path.

In the embodiment, the mapping relationship between any SR-TE path and the corresponding service flow maintained by the headend node follows the following logic:

the service flows that have not yet generated the mapping relationship will be guided to the SR-TE path having the highest scheduling priority in the SR-TE path scheduling group, the service flows that have generated the mapping relationship will be continuously guided to the previous SR-TE path, namely the currently corresponding SR-TE path, and the scheduling priority of the SR-TE path may be the highest or normal.

Based on the logic, the first service flow mentioned above specifically is a service flow that has been guided to the first SR-TE path before creating the second SR-TE path, namely the service flow that has generated the mapping relationship; and the second service flow specifically is a new service flow received by the headend node after creating the second SR-TE path, namely the service flow that has not generated the mapping relationship.

In addition, it is worth mentioning that in order to ensure that the pre-created SR-TE path scheduling group can be suitable for various usage scenarios, including a computational power network, after obtaining the SR-TE path scheduling group, a current network topological structure may further be determined regularly, and then the SR-TE path scheduling group is maintained according to the current network topological structure.

The mode of determining the network topological structure may be determined by the controller regularly and actively, or in a case that the network topological structure changes, change information of the network topological structure is passively received, so that the current network topological structure is determined, which is not limited in the embodiment.

In addition, in the embodiment, maintaining the SR-TE path scheduling group mentioned above may be updating forwarding information of a certain SR-TE path in the SR-TE path scheduling group, or deleting a certain SR-TE path.

In the embodiment, after updating or deleting the SR-TE path in the SR-TE path scheduling group, it is necessary to reset the scheduling priorities of the remaining SR-TE paths according to the actual situations.

As for the operation of updating the SR-TE path in the SR-TE path scheduling group mentioned above, in an example, a specific implementation is as follows:

> updating, as for each SR-TE path in the SR-TE path scheduling group and if service functions provided by all the service nodes on the SR-TE paths are not invalid, forwarding information corresponding to the SR-TE paths according to the network topological structure, such that the headend node forwards the service flow according to updated forwarding information of the SR-TE paths.

It should be noted that due to the updating of the SR-TE path, only the forwarding information of the new service function is updated to the corresponding service node, the service function originally provided by each service node is still valid. Therefore, in general, updating the SR-TE path may not change the scheduling priority of the SR-TE path.

Correspondingly, as for the operation of deleting the SR-TE path in the SR-TE path scheduling group mentioned above, in an example, a specific implementation is as follows:

> deleting, as for each SR-TE path in the SR-TE path scheduling group and if the service nodes of which provided service functions are invalid exist on the SR-TE paths, the SR-TE paths according to the network topological structure, and notifying the headend node to delete the SR-TE paths and a mapping relationship between the SR-TE paths and the forwarded service flow.

In addition, the operation of deleting the SR-TE path is to ensure that there is always one SR-TE path having the highest scheduling priority in the SR-TE path scheduling group after deleting the SR-TE path. Therefore, in a case of deleting the SR-TE path, it is necessary to determine whether the scheduling priority corresponding to the current to-be-deleted SR-TE path is the highest scheduling priority firstly.

Correspondingly, if the scheduling priority of the current to-be-deleted SR-TE path is the highest scheduling priority, a new SR-TE path that also meets the user demand is created as the second SR-TE path, or if new creation fails, a suitable third SR-TE path is selected from the SR-TE path scheduling group as the second SR-TE path, the scheduling priority of the second SR-TE path is set to the highest scheduling priority, and then the operation of deleting the SR-TE path according to the network topological structure is executed; and if the scheduling priority of the current to-be-deleted SR-TE path is not the highest scheduling priority, the operation of deleting the SR-TE path according to the network topological structure is directly executed.

Therefore, by monitoring whether all the service functions provided by the service nodes on the SR-TE paths are invalid, the SR-TE paths where the service nodes are located are updated or deleted, so that the obtained SR-TE path scheduling group is maintained, and the SR-TE paths in the SR-TE path scheduling group can better provide services.

Figure 2:
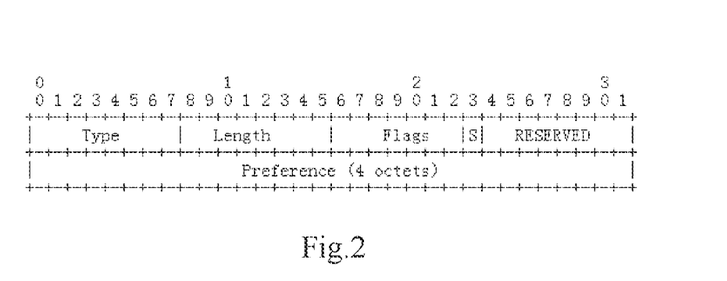
FIG. 2 is a schematic diagram of packet information packaged by a headend node in a packet header of a service flow that needs to be scheduled according to an SR-TE path scheduling group delivered by a controller in a traffic scheduling method applied to the controller and provided by an embodiment of the present application.
Figure 3:
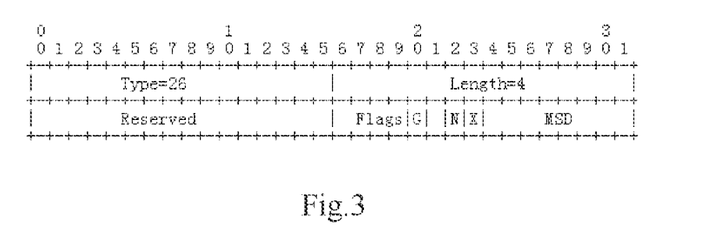
FIG. 3 is another schematic diagram of packet information packaged by a headend node in a packet header of a service flow that needs to be scheduled according to an SR-TE path scheduling group delivered by a controller in a traffic scheduling method applied to the controller and provided by an embodiment of the present application.

From the above description, it can be seen that there are various specific forms of the SR-TE paths and the SR-TE path scheduling group, in order to better understand the traffic scheduling method provided by the embodiment, specific descriptions are provided by taking "the SR-TE path is a candidate path in an SR-TE policy, and the SR-TE path scheduling group is the SR-TE policy" and "the SR-TE path is an SR-TE tunnel, and the SR-TE path scheduling group is a group formed by a plurality of SR-TE tunnels" as examples respectively and in conjunction with FIG. 2 to FIG. 3:

Mode 1: the SR-TE path is a candidate path in an SR-TE policy, and the SR-TE path scheduling group is the SR-TE policy.

In the embodiment, draft-ietf-idr-segment-routing-te-policy-11 describes how the controller delivers the SR-TE policy to the headend node on the network through a border gateway protocol (BGP) channel, an SR-TE policy may contain a plurality of candidate paths, and each candidate path may internally contain a plurality of segment lists to form load sharing. In a case of annunciating the SR-TE policy through the BGP, actually the candidate path is taken as a unit, that is, a key value <Distinguisher, Policy Color, Endpoint> of SR Policy SAFI NLRI actually represents a candidate path. <Policy Color, Endpoint> identifies an SR-TE policy, and Distinguisher identifies a certain candidate path in the SR-TE policy. An attribute of the candidate path is carried in a tunnel encaps attribute. In the prior art, in the plurality of candidate paths included in the SR-TE policy, the candidate path having the highest priority represented by the priority attribute (specified by preference sub-TLV) can only take effect. Obviously, this effective logic does not meet the requirements of the embodiment.

Therefore, the embodiment will add a scheduling field (represented by scheduling flag, the field occupies 1 bit and is denoted as S-Flag) in a flags field of the preference sub-TLV of the candidate path, as a switch flag to represent whether the candidate path has the highest scheduling priority or the normal scheduling priority. Referring to FIG. 2, in a case that the S-Flag is set to 1, it indicates that the candidate path has the highest scheduling priority in the SR-TE policy to which it belongs, and in a case that the S-Flag is set to 0, it indicates the normal scheduling priority.

Rules for setting and processing the S-Flag by the controller and the headend node are specifically as follows:

the controller internally maintains the SR-TE path scheduling group (referred to as the SR-TE policy), whenever a new SR-TE path (referred to as the candidate path) is calculated in the SR-TE path scheduling group, the controller sets the new candidate path to have the highest scheduling priority, and meanwhile sets other existing candidate paths in the SR-TE policy to the normal scheduling priority. The controller delivers the new candidate path separately to the headend node, with its S-Flag set to 1, and the whole updated SR-TE path scheduling group may also be delivered to the headend node. The headend node adds the new candidate path to a corresponding locally saved SR-TE policy instance after receiving, in the SR-TE policy instance, the scheduling priority of the new candidate path is set to the highest scheduling priority, and meanwhile the scheduling priorities of other existing candidate paths in the SR-TE policy instance are set to the normal scheduling priority.

As for the situation of updating the SR-TE path in the SR-TE path scheduling group: in a case that the controller updates the forwarding information for a certain existing SR-TE path (the candidate path herein) in the SR-TE path scheduling group (the SR-TE policy herein), the scheduling priority of the candidate path is not changed, and in a case of delivering the updating of the candidate path to the headend node, its S-Flag is set according to the scheduling priority of the candidate path. The headend node updates the forwarding information of the existing candidate path in the locally saved SR-TE policy after receiving.

In the embodiment, since the headend node is unclear whether the updating sent to it by the controller only involves changes in the forwarding information or the scheduling priority, the headend node may also set the scheduling priority of each candidate path in the group according to the S-Flag of the received candidate path. That is, if the S-Flag of the received candidate path is 1, the candidate path is set to have the highest scheduling priority, and all other candidate paths in the group are set to have the normal scheduling priority. If the S-Flag of the received candidate path is 0, the candidate path is set to have the normal scheduling priority.

As for the situation of deleting the SR-TE path in the SR-TE path scheduling group: in a case that the controller deletes a certain existing SR-TE path (the candidate path herein) in the SR-TE path scheduling group (the SR-TE policy herein), there are two situations:

if the deleted candidate path does not have the highest scheduling priority, the scheduling priorities of other candidate paths in the group are not changed, and in a case that the candidate path delivers a deletion to the headend node, its S-Flag is set to 0. The headend node deletes the candidate path in the locally saved SR-TE policy after receiving.

If the deleted candidate path has the highest scheduling priority, and in a case that the candidate path delivers a deletion to the headend node, its S-Flag may be set to 1 or 0. The headend node deletes the candidate path in the locally saved SR-TE policy after receiving. Next, the controller should calculate a new candidate path for the group again (note: it may reuse an existing candidate path in the group) and set it to have the highest scheduling priority, and in a case that the new candidate path is delivered to the headend node, its S-Flag is set to 1. The headend node adds the new candidate path to a corresponding locally saved SR-TE policy after receiving (note: it may reuse an existing candidate path in the group), sets the new candidate path to have the highest scheduling priority in the SR-TE policy, and meanwhile sets other existing candidate paths in the SR-TE policy to have the normal scheduling priority.

As mentioned above, in addition to using the switch flag to reflect the scheduling priority of the SR-TE path, there are many other modes, which is not limited in the embodiment. The specific implementation of using other methods to reflect the scheduling priority of the SR-TE path, as well as the type of the switch flag adopted above, will not be repeated here.

Mode 2: the SR-TE path is an SR-TE tunnel, and the SR-TE path scheduling group is a group formed by a plurality of SR-TE tunnels.

RFC8664 and draft-ietf-pce-segment-routing-ipv6-08 describe how the controller delivers the SR-TE tunnel to the headend node through a path computation element communication protocol (PCEP) channel. RFC8697 defines an association object, which may be used for forming a plurality of SR-TE tunnels into a group. In the embodiment, a new association type, called "flow scheduling group", is added for the association object, a value in an association ID field is managed and set by the controller, indicating an identifier of the SR-TE path scheduling group, and a value in an IPv4 association source or IPv6 association source field is the headend node of the SR-TE tunnel. In a case that the plurality of SR-TE tunnels delivered by the controller through the PCEP to the headend node contain the same association source and association ID, it indicates that these SR-TE tunnels belong to the same SR-TE path scheduling group.

In addition, in order to support the explicit request of the headend node to the controller for calculating a new SR-TE path for the SR-TE path scheduling group according to resource changes in the network during path calculation, it is necessary to expand capability negotiation information of the PCEP, and in a Flags field of SR-PCE-CAPABILITY Sub-TLV or SRv6-PCE-CAPABILITY sub-TLV, a flag G-Flag is newly added. Referring to FIG. 3, if a value of the G-Flag is 1, it indicates that a path computation element (PCE) or a path computation client (PCC) of a notifying party supports maintaining the SR-TE path scheduling group provided in the embodiment, and selects a path from the group for traffic scheduling based on the scheduling priority.

SR-PCE-CAPABILITY Sub-TLV is taken as an example, as shown in FIG. 3. Only in a case that both the PCC and the PCE set the G-Flag to 1 in the capability notification information, it indicates that an established PCEP session supports the SR-TE path scheduling group provided in the embodiment.

In addition, RFC8231 defines an LSP object, which may be used for identifying a key value and an attribute of the SR-TE tunnel. In draft-ietf-pce-lsp-extended-flags-00, LSP-EXTENDED-FLAG TLV is defined for the LSP object, and is used for setting richer flag information. In the embodiment, the G-Flag is newly added to LSP-EXTENDED-FLAG TLV, and is used for the situation that in a case that the PCC requests path calculation to the PCE, if it is set to 1, the PCE is required to calculate a new SR-TE path for the SR-TE path scheduling group according to the resource changes in the network, and if it is set to 0, there is no requirement.

Figure 4:
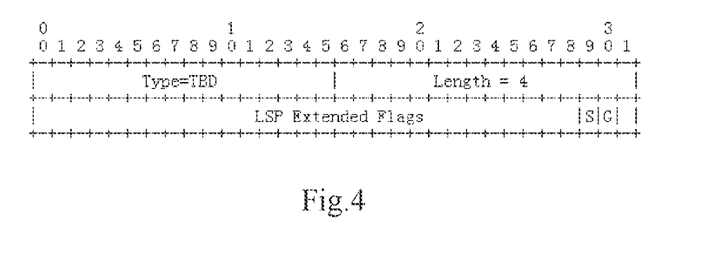
FIG. 4 is yet another schematic diagram of packet information packaged by a headend node in a packet header of a service flow that needs to be scheduled according to an SR-TE path scheduling group delivered by a controller in a traffic scheduling method applied to the controller and provided by an embodiment of the present application.

In addition, a scheduling flag is newly added, and is used for the situation that in a case that the PCE delivers the path to the PCC, if it is set to 1, it indicates that the SR-TE tunnel has the highest scheduling priority in the SR-TE path scheduling group to which it belongs, and if it is set to 0, it indicates the normal scheduling priority, which may refer to FIG. 4 for details.

In addition, it is worth mentioning that the rules for setting the S-Flag by the controller and the headend node are similar to the aforementioned SR-TE policy candidate path modes, which will not be repeated here.

It should be understood that the above examples are only listed for a better understanding of the technical solutions of the embodiment, and are not the only limitations to the embodiment.

In addition, as for the relevant English technical terms mentioned above, there are no specific explanations in the art. During specific implementation, those skilled in the art may refer to draft files related to segment routing, such as draft-ietf-idr-segment-routing-te-policy-11, draft-ietf-pce-lsp-extended-flags-00, RFC8664 and draft-ietf-pce-segment-routing-ipv6-08, which will not be repeated in the embodiment.

Through the above description, it is not difficult to find that according to the traffic scheduling method provided in the embodiment, the controller always identifies that the load of the service functions provided on certain service nodes in the network is too heavy according to the utilization rate of various preset resources collected in the network, and then checks whether the SR-TE path having the highest scheduling priority in the SR-TE path scheduling group contains the service nodes of these service functions. If yes, a new SR-TE path is calculated for the SR-TE path scheduling group, namely the second SR-TE path mentioned above, so that the headend node can serve the new service flow that meets the preset condition received later through the second SR-TE path, that is, the new service flow is always matched to the SR-TE path having the highest scheduling priority in the SR-TE path scheduling group, and the old service flow (the first service flow mentioned above) is still maintained and guided to the original SR-TE path, which ensures the balance of resource utilization in the network and the load balance of the service nodes providing the service functions, and can also select the SR-TE path according to the actual demands, realizing dynamic traffic scheduling, thereby better improving the quality of services.

Figure 5:
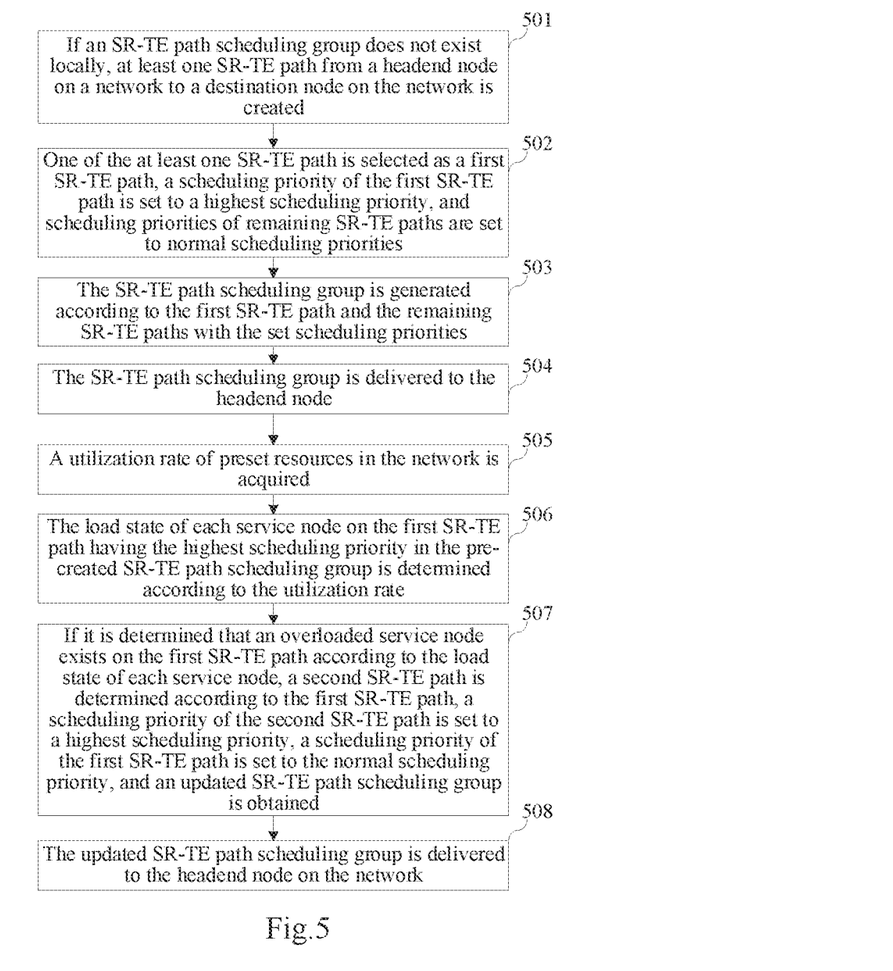
FIG. 5 is another flowchart of a traffic scheduling method applied to a controller and provided by an embodiment of the present application.

Referring to FIG. 5, FIG. 5 is a flowchart of a traffic scheduling method provided by an embodiment of the present application, and in the embodiment, the method is mainly applied to a controller.

As shown in FIG. 5, the traffic scheduling method involved in the embodiment includes the following steps:

step 501, if an SR-TE path scheduling group does not exist locally, at least one SR-TE path from a headend node on a network to a destination node on the network is created.

In the embodiment, as for the creation of the SR-TE path, in an example, it may be created by the controller according to user demands and service scenarios.

In addition, it may be understood that the operation of creating the SR-TE path may be that the controller actively creates it after receiving due trigger or a request of the headend node, which is not limited in the embodiment.

Step 502, one of the at least one SR-TE path is selected as a first SR-TE path, a scheduling priority of the first SR-TE path is set to a highest scheduling priority, and scheduling priorities of remaining SR-TE paths are set to normal scheduling priorities.

It may be understood that if only one SR-TE path is created, the SR-TE path is the first SR-TE path, and its scheduling priority is the highest scheduling priority.

If there are a plurality of SR-TE paths, an optimal SR-TE path may be dynamically selected as the first SR-TE path according to actual situations, such as a current load state of service nodes on each SR-TE path, the highest scheduling priority is set for the determined first SR-TE path, and the normal scheduling priorities are set for the other remaining SR-TE paths in the SR-TE path scheduling group.

Step 503, the SR-TE path scheduling group is generated according to the first SR-TE path and the remaining SR-TE paths with the set scheduling priorities.

In the embodiment, the SR-TE path scheduling group mentioned in the embodiment refers to a group that manages the SR-TE paths that can be applied to the same user demand and service scenario, that is, any SR-TE path in the same SR-TE path scheduling group is specific to the same user demand and service scenario.

Step 504, the SR-TE path scheduling group is delivered to the headend node.

The mode of delivering the SR-TE path scheduling group by the headend node is roughly the same as step 104 in the method embodiment corresponding to FIG. 1, which will not be repeated here.

Step 505, a utilization rate of preset resources in the network is acquired.

Step 506, the load state of each service node on the first segment routing traffic engineering (SR-TE) path having the highest scheduling priority in the pre-created SR-TE path scheduling group is determined according to the utilization rate.

Step 507, if it is determined that an overloaded service node exists on the first SR-TE path according to the load state of each service node, a second SR-TE path is determined according to the first SR-TE path, a scheduling priority of the second SR-TE path is set to a highest scheduling priority, a scheduling priority of the first SR-TE path is set to the normal scheduling priority, and an updated SR-TE path scheduling group is obtained.

Step 508, the updated SR-TE path scheduling group is delivered to the headend node on the network.

It is not difficult to find that step 505 to step 508 in the embodiment are roughly the same as step 101 to step 104 in the method embodiment corresponding to FIG. 1, which will not be repeated here.

Therefore, according to the traffic scheduling method provided by the embodiment, it is ensured that the controller that adopts the traffic scheduling method provided by the embodiment firstly can provide available SR-TE paths for the headend node, and also ensured that in the traffic scheduling process, the quantity of the SR-TE paths in the SR-TE path scheduling group and the scheduling priority corresponding to each SR-TE path can be dynamically adjusted according to the dynamically changing network resources and the load of the service nodes, so that the headend node can better provide services based on the SR-TE paths in the dynamically changing SR-TE path scheduling group.

Figure 6:
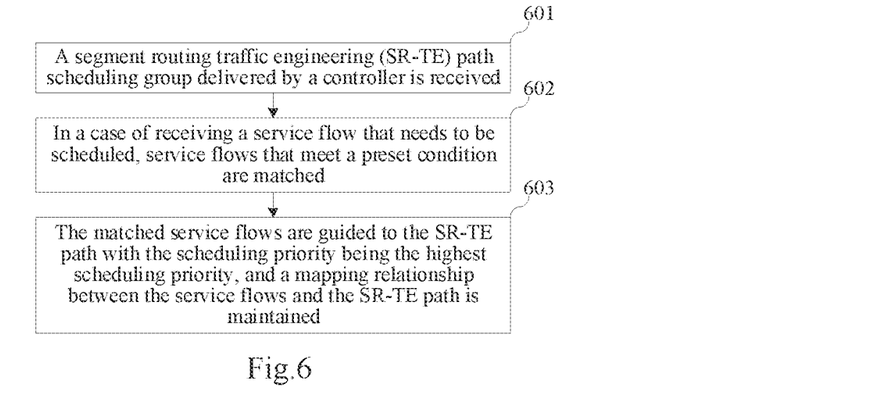
FIG. 6 is a flowchart of a traffic scheduling method applied to a headend node and provided by an embodiment of the present application.

Referring to FIG. 6, FIG. 6 is a flowchart of a traffic scheduling method provided by an embodiment of the present application, and in the embodiment, the method is mainly applied to a headend node.

It may be understood that in practical applications, the headend node, based on the traffic scheduling method provided by the embodiment, needs to cooperate with the above controller to realize traffic scheduling. Therefore, the relevant technical details recorded in the above embodiments of the traffic scheduling method applied to the controller may also be applied to the embodiment.

As shown in FIG. 6, the traffic scheduling method involved in the embodiment includes the following steps:

step 601, a segment routing traffic engineering (SR-TE) path scheduling group delivered by a controller is received.

In the embodiment, the SR-TE path scheduling group at least includes one SR-TE path with a scheduling priority being a highest scheduling priority.

Step 602, in a case of receiving a service flow that needs to be scheduled, service flows that meet a preset condition are matched.

Step 603, the matched service flows are guided to the SR-TE path with the scheduling priority being the highest scheduling priority, and a mapping relationship between the service flows and the SR-TE path is maintained.

For convenience of understanding, it is described in conjunction with examples below:

assuming that the preset condition is "all packets to a destination IP are server1-IP", enable policy routing that can be matched with the packet that meets the above preset condition is pre-configured in a user interface corresponding to the headend node, so that in a case that the user interface receives a user packet, based on the configured enable policy routing, the received user packet is matched, such as matching a 5-tuple of the user packet to meet the preset condition.

If there are 10 matched service flows, such as flow1 to flow10, the headend node will guide all the 10 service flows to the SR-TE path having the highest scheduling priority, establish the mapping relationships between the flow1 flow10 and the SR-TE path having the highest scheduling priority respectively, meanwhile monitor them in a process of forwarding these service flows, and maintain these mapping relationships according to monitoring results, such as updating or deleting.

The operation of maintaining the mapping relationships between the service flows and the SR-TE path by the headend node specifically is:

establishing the mapping relationships between the service flows and the SR-TE path, and counting a flowmeter value of the service flow corresponding to the SR-TE path; and deleting, if the flowmeter value does not change within preset time, the mapping relationships between the service flows and the SR-TE path.

In addition, in another example, if the headend node receives a deleting notification of the SR-TE path from the controller, the mapping relationship between the service flow and the SR-TE path is deleted.

Further, after deleting the mapping relationship between a certain service flow and the SR-TE path, if the service flow is received again, the service flow is guided to the SR-TE path with the scheduling priority being the highest scheduling priority in the SR-TE path scheduling group, and the mapping relationship between the service flow and the SR-TE path with the scheduling priority being the highest scheduling priority in the SR-TE path scheduling group is maintained.

In addition, if the optimal SR-TE path, namely the SR-TE path having the highest scheduling priority, in the SR-TE path scheduling group is deleted, the headend node will further receive the updating of the SR-TE path scheduling group from the controller, which contains a new SR-TE path that has the highest scheduling priority, or reuses a certain old SR-TE path that has the highest scheduling priority.

In addition, in another example, if the headend node receives updating information for a certain SR-TE path delivered by the controller, the SR-TE path is updated according to the updating information.

Therefore, according to the traffic scheduling method provided by the embodiment, in a case that the headend node performs traffic scheduling by using the SR-TE paths generated by the controller according to dynamically changing network resources and a load of service nodes, by actively monitoring a usage situation for a certain SR-TE path in the traffic scheduling process and receiving the updating information for a certain SR-TE path delivered by the controller, the mapping relationships between the service flows and the SR-TE path are dynamically maintained, so that the SR-TE paths can be selected according to actual demands, that is, dynamic traffic scheduling is realized, and then the quality of services is better improved.

Figure 7:
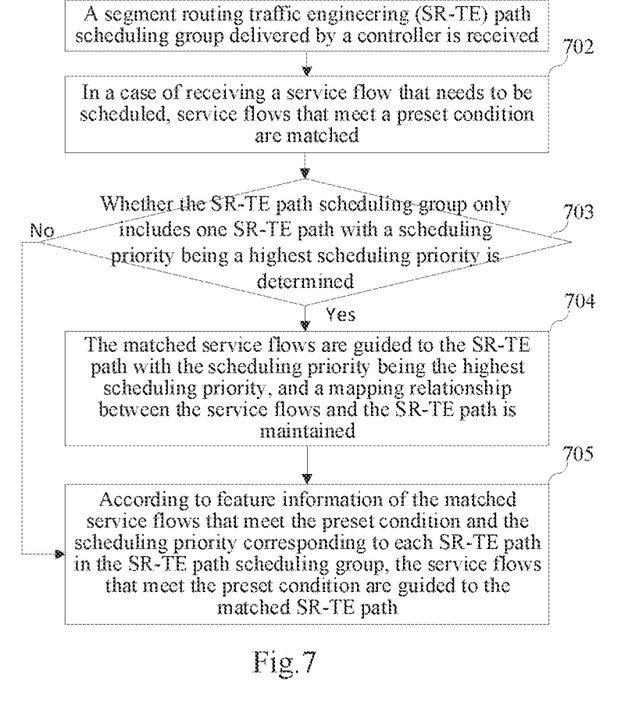
FIG. 7 is another flowchart of a traffic scheduling method applied to a headend node and provided by an embodiment of the present application.

Referring to FIG. 7, FIG. 7 is a flowchart of a traffic scheduling method provided by an embodiment of the present application, and in the embodiment, the method is mainly applied to a headend node.

As shown in FIG. 7, the traffic scheduling method involved in the embodiment includes the following steps:

step 701, a segment routing traffic engineering (SR-TE) path scheduling group delivered by a controller is received.

In the embodiment, the SR-TE path scheduling group at least includes one SR-TE path with a scheduling priority being a highest scheduling priority.

Step 702, in a case of receiving a service flow that needs to be scheduled, service flows that meet a preset condition are matched.

It is not difficult to find that step 701 and step 702 in the embodiment are roughly the same as step 601 and step 602 in the method embodiment corresponding to FIG. 6, which will not be repeated here.

Step 703, whether the SR-TE path scheduling group only includes one SR-TE path with a scheduling priority being a highest scheduling priority is determined.

Specifically, if yes, step 704 is executed, and otherwise, step 705 is executed.

In addition, in an example, the mode of determining whether the SR-TE path scheduling group only includes one SR-TE path with the scheduling priority being the highest scheduling priority may be determined by determining the quantity of the SR-TE paths in the SR-TE path scheduling group. That is, in a case that the quantity of the SR-TE paths included in the SR-TE path scheduling group is 1, the SR-TE path scheduling group only includes one SR-TE path having the highest scheduling priority, and if the quantity of the SR-TE paths is greater than 1, it indicates that in addition to one SR-TE path having the highest scheduling priority, the SR-TE path scheduling group further includes SR-TE paths having normal scheduling priorities.

Step 704, the matched service flows are guided to the SR-TE path with the scheduling priority being the highest scheduling priority, and a mapping relationship between the service flows and the SR-TE path is maintained.

It is not difficult to find that step 704 in the embodiment is roughly the same as step 603 in the method embodiment corresponding to FIG. 6, which will not be repeated here.

Step 705, according to feature information of the matched service flows that meet the preset condition and the scheduling priority corresponding to each SR-TE path in the SR-TE path scheduling group, the service flows that meet the preset condition are guided to the matched SR-TE path.

In the embodiment, in a case that there are at least two SR-TE paths (one having the highest scheduling priority, and one having the normal scheduling priority) in the SR-TE path scheduling group, the operation mentioned in above step 705 specifically is:

firstly, screening, according to the feature information of the matched service flows that meet the preset condition and the scheduling priority corresponding to each SR-TE path in the SR-TE path scheduling group, a new service flow received after determining the SR-TE path with a current scheduling priority being the highest scheduling priority in the SR-TE path scheduling group from the service flows that meet the preset condition; and then, guiding the new service flow to the SR-TE path with the current scheduling priority being the highest scheduling priority, and guiding the remaining service flows to the corresponding SR-TE paths according to the previously maintained mapping relationship between the service flows and the SR-TE path.

For example, as mentioned above, the headend node has created corresponding mapping relationship table entries for flow1 to flow10. In a case that the headend node continues to receive flow1 to flow10 from a user interface, based on the logic of the mapping relationships, they will be guided to the first SR-TE path for forwarding, even though the second SR-TE path has the highest scheduling priority in the SR-TE path scheduling group at this time. Assuming that after this, the headend node continues to receive a plurality of new service flows that meet the above preset condition, such as flow11 to flow20, from the user interface, the headend node will guide flow11 to flow20 to the second SR-TE path, and generate corresponding mapping relationships for being guided to the specific SR-TE paths for these flows.

Therefore, according to the traffic scheduling method provided by the embodiment, the headend node creates and dynamically maintains the mapping relationship with the corresponding SR-TE path for each received service flow that meets the preset condition, the scheduling priority is set for each SR-TE path based on the controller, which realizes that the old service flow is guided to the SR-TE path that already has the mapping relationship, and the new service flow is guided to the SR-TE path having the highest scheduling priority, so that each SR-TE path in the SR-TE path scheduling group is reasonably selected according the actual demands, traffic scheduling is more reasonable, and the quality of services is further improved.

In addition, it should be understood that the step division of the above methods is only for clear description. During implementation, they may be merged into one step, or some steps may be split into a plurality of steps, and as long as the same logical relationship is included, they are all within the scope of protection of the patent. Adding irrelevant modifications or introducing irrelevant designs to algorithms and processes, but not changing the core design of their algorithms and processes, is within the scope of protection of the patent.

Figure 8:
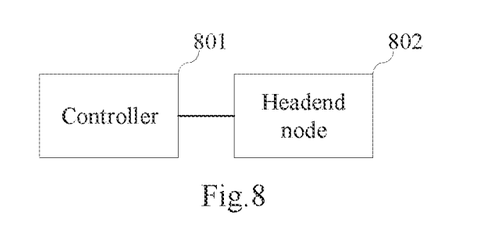
FIG. 8 is a schematic structural diagram of a traffic scheduling system provided by an embodiment of the present application.

Referring to FIG. 8, FIG. 8 is a schematic structural diagram of a traffic scheduling system provided by an embodiment of the present application, and in the embodiment, the traffic scheduling system includes a controller 801 and a headend node 802.

The controller 801 is configured to acquire a utilization rate of preset resources in a network, and determine, according to the utilization rate, a load state of each service node on a first segment routing traffic engineering (SR-TE) path having a highest scheduling priority in a pre-created SR-TE path scheduling group.

Correspondingly, if it is determined that an overloaded service node exists on the first SR-TE path according to the load state of each service node, the controller 801 is further configured to determine a second SR-TE path according to the first SR-TE path, set a scheduling priority of the second SR-TE path to a highest scheduling priority, set a scheduling priority of the first SR-TE path to a normal scheduling priority to obtain an updated SR-TE path scheduling group, and deliver the updated SR-TE path scheduling group to the headend node.

The headend node 802 is configured to guide, in a case of receiving a service flow that needs to be scheduled, a first service flow that meets a preset condition to the first SR-TE path, guide a second service flow that meets the preset condition to the second SR-TE path, and maintain a mapping relationship between the first service flow and the first SR-TE path, and between the second service flow and the second SR-TE path.

It should be noted that in the embodiment, the first service flow is a service flow that has been guided to the first SR-TE path before creating the second SR-TE path, and the second service flow is a new service flow received by the headend node after creating the second SR-TE path.

Figure 9:
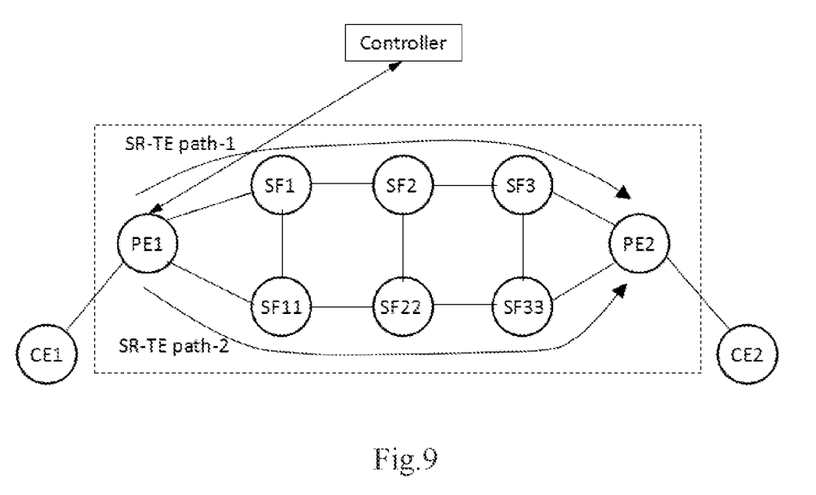
FIG. 9 is a schematic structural diagram of an actual network for traffic scheduling based on the traffic scheduling system diagram shown in FIG. 8.

In order to better understand the cooperation between the controller and the headend node in the traffic scheduling process, the embodiment is specifically described in conjunction with FIG. 9:

in a network shown in FIG. 9, a host of a CE1 needs to send service traffic to a server on a far-end CE2. According to service demands, the controller needs to calculate an SR-TE policy from a headend node PE1 to a destination node PE2 in a carrier network, and a corresponding segment list needs to contain three ordered service functions: a service function 1, a service function 2 and a service function 3, so as to perform corresponding service function processing for packets.

It is assumed that the controller has collected service function information provided by all nodes (or provided by agents) in the network through a certain mechanism, and continuously perceives change information of the utilization rate of these service functions through a certain mechanism. In the embodiment, a node SF1 and a node SF11 both provide the service function 1, with corresponding service SIDs being SID-SF1 and SID-SF11 respectively; a node SF2 and a node SF22 both provide the service function 2, with corresponding service SIDs being SID-SF2 and SID-SF22 respectively; and a node SF3 and a node SF33 both provide the service function 3, with corresponding service SIDs being SID-SF3 and SID-SF33.

In addition, it is assumed that an SRv6 SID of an END type of the PE2 is SID1-PE2, and an SRv6 VPN SID of an END.DX6 type allocated for the CE2 customer is SID100-PE2.

As for this user demand, it is assumed that an SR-TE policy instance created by the controller is <Headend=PE1, Color=1000, Endpoint=PE2>, according to an idle situation of each service function in the network, the initially calculated candidate path is an SR-TE path-1 in FIG. 9, and a corresponding SID list is {SID-SF1, SID-SF2, SID-SF3, SID1-PE2}. Data maintained in the controller is as follows:

SR-TE policy<Headend=PE1, Color=1000, Endpoint=PE2>
    Candidate Path Name: SR-TE path-1
        Scheduling priority: the highest
        SID List: {SID-SF1, SID-SF2, SID-SF3, SID1-PE2}

The controller delivers the above candidate path to the headend node PE1 through the BGP, and the S-Flag in preference sub-TLV is set to 1.

After receiving information about the SR-TE path scheduling group delivered by the controller, the headend node PE1 performs operations similar to the controller internally to maintain the following data:

SR-TE policy <Headend=PE1, Color=1000, Endpoint=PE2>
    Candidate Path Name: SR-TE path-1
        Scheduling priority: the highest
        SID List: {SID-SF1, SID-SF2, SID-SF3, SID1-PE2}

The headend node PE1 configures an access control list (ACL) on a link connected with the CE1, and guides the service flow that meets the preset condition to the above SR-TE policy. In the embodiment, it is assumed that a matching condition is "all packets to a destination IP being server1-ip", where server1-ip is an IP address of a certain server1 on the CE2. It is assumed that the headend node PE1 adopts a two-tuples of <source IP, destination IP> to maintain the mapping relationship table entries between the service flow and the SR-TE path. At this time, it is assumed that the PE1 receives the following 3 traffic from the CE1:

<source IP=host1-ip, destination IP=server1-ip>
    <source IP=host2-ip, destination IP=server1-ip>
    <source IP=host3-ip, destination IP=server1-ip>
    where, the host1-ip, the host2-ip and the host3-ip are different hosts on the CE1, and they all access the server1 on the CE2. Then, the PE1 guides these flows to the above SR-TE policy, and selects the candidate path having the highest scheduling priority from the SR-TE policy to be applied to these flows. At this time, the mapping relationship table entries of the service flows maintained by the PE1 are as follows:
    <source IP=host1-ip, destination IP=server1-ip> is mapped to the candidate path: SR-TE path-1 of the SR-TE policy <Headend=PEL Color=1000, Endpoint=PE2>.
    <source IP=host2-ip, destination IP=server1-ip> is mapped to the candidate path: SR-TE path-1 of the SR-TE policy <Headend=PEL Color=1000, Endpoint=PE2>.
    <source IP=host3-ip, destination IP=server1-ip> is mapped to the candidate path: SR-TE path-1 of the SR-TE policy <Headend=PEL Color=1000, Endpoint=PE2>.

Based on this, these service flows will package an SRv6 SID List {SID-SF1, SID-SF2, SID-SF3, SID1-PE2, SID100-PE2} for transmission in the network, and apply corresponding service functions along the way through the SF1, the SF2 and the SF3.

It should be noted that during specific implementation, the SID (SRv6 VPN SID) of a virtual private network of an SR solution extended based on IPv6 needs to be inserted at an end of an SID list.

After the service traffic is transmitted in the network, if the controller perceives that the utilization rate of the corresponding server functions provided on one or more nodes in the SF1, the SF2 and the SF3 in the network is too high, and the network actually further has other nodes that provide the same server functions, the controller starts to calculate a new candidate path for the above SR-TE policy for a new service flow. In the embodiment, it is assumed that the calculated new candidate path is an SR-TE path-2 in FIG. 9, and a corresponding SID list is {SID-SF11, SID-SF22, SID-SF33, SID1-PE2}. Data maintained in the controller is changed as follows:

SR-TE policy <Headend=PEL Color=1000, Endpoint=PE2>
    Candidate Path Name: SR-TE path-1
        Scheduling priority: normal
        SID List: {SID-SF1, SID-SF2, SID-SF3, SID1-PE2}
    Candidate Path Name: SR-TE path-2
        Scheduling priority: the highest
        SID List: {SID-SF11, SID-SF22, SID-SF33, SID1-PE2}

In addition, it is worth noting that while the controller sets the scheduling priority of the candidate path to be the highest, it also needs to lower the scheduling priorities of other candidate paths to be normal.

Correspondingly, the controller delivers the above candidate path to the headend node PE1 through the BGP, and the S-Flag in preference sub-TLV is set to 1.

After receiving information about the SR-TE path scheduling group delivered by the controller, the headend node PE1 performs operations similar to the controller internally to maintain the following data:

SR-TE policy <Headend=PE1, Color=1000, Endpoint=PE2>
    Candidate Path Name: SR-TE path-1
        Scheduling priority: the highest
        SID List: {SID-SF1, SID-SF2, SID-SF3, SID1-PE2}

In addition, it is worth noting that the headend node PE1 discovers that the scheduling priority of the new candidate path is the highest, and then automatically lowers the scheduling priorities of other candidate paths to be normal.

It is assumed that after this, the headend node PE1 receives the following 3 flows from the CE1:

<source IP=host4-ip, destination IP=server1-ip>
    <source IP=host5-ip, destination IP=server1-ip>
    <source IP=host6-ip, destination IP=server1-ip>
    where, the host4-ip, the host5-ip and the host6-ip are different hosts on the CE1, and they all access the server1 on the CE2. Then, the PE1 also guides these flows to the above SR-TE policy, and selects the candidate path having the highest scheduling priority from the SR-TE policy to be applied to these flows. At this time, the mapping relationship table entries of the service flows maintained by the PE1 are changed as follows:
    <source IP=host1-ip, destination IP=server1-ip> is mapped to the candidate path: SR-TE path-1 of the SR-TE policy <Headend=PEL Color=1000, Endpoint=PE2>.
    <source IP=host2-ip, destination IP=server1-ip> is mapped to the candidate path: SR-TE path-1 of the SR-TE policy <Headend=PEL Color=1000, Endpoint=PE2>.
    <source IP=host3-ip, destination IP=server1-ip> is mapped to the candidate path: SR-TE path-1 of the SR-TE policy <Headend=PEL Color=1000, Endpoint=PE2>.
    <source IP=host4-ip, destination IP=server1-ip> is mapped to the candidate path: SR-TE path-2 of the SR-TE policy <Headend=PEL Color=1000, Endpoint=PE2>.

<source IP=host5-ip, destination IP=server1-ip> is mapped to the candidate path: SR-TE path-2 of the SR-TE policy <Headend=PE1, Color=1000, Endpoint=PE2>.

<source IP=host6-ip, destination IP=server1-ip> is mapped to the candidate path: SR-TE path-2 of the SR-TE policy <Headend=PE1, Color=1000, Endpoint=PE2>.

Based on this, these new service flows will package an SRv6 SID List {SID-SF11, SID-SF22, SID-SF33, SID1-PE2, ID100-PE2} for transmission in the network, and apply corresponding service functions along the way through the SF11, the SF22 and the SF33. The old service flows will package an SRv6 SID List {SID-SF1, SID-SF2, SID-SF3, SID1-PE2, SID100-PE2} for transmission in the network, and apply corresponding service functions along the way through the SF1, the SF2 and the SF3, so that the utilization rate of the resources on each node in the network is more balanced.

In addition, in another example, after the mapping relationship table entries of the above service flows are created on the headend node PE1, the packet number of these service flows begins to be counted. Assuming that within a certain period of time, the service flow corresponding to <source IP=host1-ip, destination IP=server1-ip> is received no longer from the CE1, and then the PE1 may age and delete the mapping relationship table entries of the corresponding service flows, so as to reduce the size of the table entries. That is, the mapping table entries of the service flows maintained by the PE1 are changed as:

<source IP=host2-ip, destination IP=server1-ip> is mapped to the candidate path: SR-TE path-1 of the SR-TE policy <Headend=PE1, Color=1000, Endpoint=PE2>.

<source IP=host3-ip, destination IP=server1-ip> is mapped to the candidate path: SR-TE path-1 of the SR-TE policy <Headend=PE1, Color=1000, Endpoint=PE2>.

<source IP=host4-ip, destination IP=server1-ip> is mapped to the candidate path: SR-TE path-2 of the SR-TE policy <Headend=PE1, Color=1000, Endpoint=PE2>.

<source IP=host5-ip, destination IP=server1-ip> is mapped to the candidate path: SR-TE path-2 of the SR-TE policy <Headend=PE1, Color=1000, Endpoint=PE2>.

<source IP=host6-ip, destination IP=server1-ip> is mapped to the candidate path: SR-TE path-2 of the SR-TE policy <Headend=PE1, Color=1000, Endpoint=PE2>.

In the embodiment, if after this, the headend node PE1 suddenly receives the service flow corresponding to <source IP=host1-ip, destination IP=server1-ip> from the CE1, the corresponding mapping relationship table entries are created for the service flow again, it is guided to the above SR-TE policy, and the candidate path having the highest scheduling priority, namely the SR-TE path-2, from the SR-TE policy is selected to be scheduled from the SR-TE policy. Therefore, the mapping table entries of the service flows maintained by the PE1 are changed as:

<source IP=host1-ip, destination IP=server1-ip> is mapped to the candidate path: SR-TE path-2 of the SR-TE policy <Headend=PE1, Color=1000, Endpoint=PE2>.

<source IP=host2-ip, destination IP=server1-ip> is mapped to the candidate path: SR-TE path-1 of the SR-TE policy <Headend=PE1, Color=1000, Endpoint=PE2>.

<source IP=host3-ip, destination IP=server1-ip> is mapped to the candidate path: SR-TE path-1 of the SR-TE policy <Headend=PE1, Color=1000, Endpoint=PE2>.

<source IP=host4-ip, destination IP=server1-ip> is mapped to the candidate path: SR-TE path-2 of the SR-TE policy <Headend=PE1, Color=1000, Endpoint=PE2>.

<source IP=host5-ip, destination IP=server1-ip> is mapped to the candidate path: SR-TE path-2 of the SR-TE policy <Headend=PE1, Color=1000, Endpoint=PE2>.

<source IP=host6-ip, destination IP=server1-ip> is mapped to the candidate path: SR-TE path-2 of the SR-TE policy <Headend=PE1, Color=1000, Endpoint=PE2>.

It should be understood that the above examples are only listed for a better understanding of the technical solutions of the embodiment, and are not the only limitations to the embodiment.

Therefore, according to the traffic scheduling system provided in the embodiment, the controller always identifies that the load of the service functions provided on certain service nodes in the network is too heavy according to the utilization rate of various preset resources collected in the network, and then checks whether the SR-TE path having the highest scheduling priority in the SR-TE path scheduling group contains the service nodes of these service functions. If yes, a new SR-TE path is calculated for the SR-TE path scheduling group, namely the second SR-TE path mentioned above, so that the headend node can serve the new service flow that meets the preset condition received later through the second SR-TE path, that is, the new service flow is always matched to the SR-TE path having the highest scheduling priority in the SR-TE path scheduling group, the old service flow (the first service flow mentioned above) is still maintained and guided to the original SR-TE path, which ensures the balance of the resources in the network and the load balance of the service nodes providing the service functions, and can also select the SR-TE path according to the actual demands, realizing dynamic traffic scheduling, thereby better improving the quality of services.

It should be noted that although the SR-TE path is used to describe the traffic scheduling method in the present application, in fact, all paths represented by source routing similar to SR-TE are applicable to the method described in the present application.

An embodiment of the present application relates to a computer readable storage medium, storing a computer program. The computer program, when executed by a processor, implements the traffic scheduling method applied to the controller, or the traffic scheduling method applied to the headend node described in the above method embodiments.

That is, those skilled in the art may understand that all or part of the steps in the methods of the above embodiments may be completed by instructing relevant hardware through a program. The program is stored in a storage medium, including a plurality of instructions to enable a device (may be a single-chip computer, a chip and the like) or a processor to execute all or part of the steps of the method in each embodiment of the present application. The aforementioned storage medium includes: a USB flash disk, a mobile hard disk, a read-only memory (ROM), a random access memory (RAM), a disk, an optical disk or various media capable of storing program codes.

Those ordinarily skilled in the art may understand that the above embodiments are specific embodiments for implementing the present application, and in practical applications, various changes may be made in form and details without departing from the spirit and scope of the present application.

What is claimed is:

1. A traffic scheduling method, applied to a controller, the traffic scheduling method comprising:
acquiring a utilization rate of preset resources in a network;
determining, according to the utilization rate, a load state of each service node on a first segment routing traffic engineering (SR-TE) path having a highest scheduling priority in a pre-created SR-TE path scheduling group;
determining, if it is determined that an overloaded service node exists on the first SR-TE path according to the load state of each service node, a second SR-TE path according to the first SR-TE path, setting a scheduling priority of the second SR-TE path to a highest scheduling priority, setting a scheduling priority of the first SR-TE path to a normal scheduling priority, and obtaining an updated SR-TE path scheduling group; and
delivering the updated SR-TE path scheduling group to a headend node on the network, such that in a case of receiving a service flow that needs to be scheduled, the headend node guides a first service flow that meets a preset condition to the first SR-TE path, guides a second service flow that meets the preset condition to the second SR-TE path, and maintains a mapping relationship between the first service flow and the first SR-TE path, and between the second service flow and the second SR-TE path, wherein
the first service flow is a service flow that is guided to the first SR-TE path before the second SR-TE path is created, and the second service flow is a new service flow received by the headend node after the second SR-TE path is created.

2. The traffic scheduling method according to claim 1, wherein, before the acquiring a utilization rate of preset resources in a network, the method further comprises:
creating, if the SR-TE path scheduling group does not exist locally, at least one SR-TE path from the headend node on the network to a destination node on the network;
selecting one of the at least one SR-TE path as the first SR-TE path, setting the scheduling priority of the first SR-TE path to the highest scheduling priority, and setting scheduling priorities of remaining SR-TE paths to the normal scheduling priorities;
generating the SR-TE path scheduling group according to the first SR-TE path and the remaining SR-TE paths with the set scheduling priorities; and
delivering the SR-TE path scheduling group to the headend node, such that in a case of receiving the service flow that needs to be scheduled, the headend node guides the first service flow that meets the preset condition to the first SR-TE path, and maintains the mapping relationship between the first service flow and the first SR-TE path.

3. The traffic scheduling method according to claim 1, wherein, delivering the SR-TE path scheduling group to the headend node comprises:

traversing the SR-TE path scheduling group, and delivering the traversed SR-TE paths to the headend node; or,
packaging the SR-TE path scheduling group according to a preset format, and delivering the packaged SR-TE path scheduling group to the headend node.

4. The traffic scheduling method according to claim 3, wherein, before delivering the SR-TE path scheduling group to the headend node, the method further comprises:
allocating the same path scheduling group identifier to each SR-TE path in the SR-TE path scheduling group, such that the headend node manages the received SR-TE paths according to the path scheduling group identifier.

5. The traffic scheduling method according to claim 1, wherein after the obtaining the SR-TE path scheduling group, the method further comprises:
determining a current network topological structure; and
maintaining the SR-TE path scheduling group according to the network topological structure.

6. The traffic scheduling method according to claim 5, wherein, the maintaining the SR-TE path scheduling group according to the network topological structure, comprises:
updating, as for each SR-TE path in the SR-TE path scheduling group and if service functions provided by all service nodes on the SR-TE path are not invalid, forwarding information corresponding to the SR-TE path according to the network topological structure, such that the headend node forwards the service flow according to the updated forwarding information of the SR-TE path.

7. The traffic scheduling method according to claim 5, wherein, the maintaining the SR-TE path scheduling group according to the network topological structure, comprises:
deleting, as for each SR-TE path in the SR-TE path scheduling group and if a service node which provides invalid service function exist on the SR-TE path, the SR-TE path according to the network topological structure, and notifying the headend node to delete the SR-TE path and a mapping relationship between the SR-TE path and the forwarded service flow.

8. The traffic scheduling method according to claim 7, wherein the deleting the SR-TE path according to the network topological structure, the method further comprises:
determining whether the scheduling priority corresponding to the SR-TE path is the highest scheduling priority;
if yes, determining the second SR-TE path according to the SR-TE path, setting the scheduling priority of the second SR-TE path to the highest scheduling priority, and executing the step of deleting the SR-TE path according to the network topological structure; and
if not, directly executing the step of deleting the SR-TE path according to the network topological structure.

9. The traffic scheduling method according to claim 1, wherein, the determining a second SR-TE path according to the first SR-TE path, comprises:
acquiring a user demand corresponding to the first SR-TE path;
creating a new SR-TE path from the headend node to the destination node according to the user demand as the second SR-TE path;
or,
selecting an existing SR-TE path from the SR-TE path scheduling group as the second SR-TE path.

10. A non-transitory computer readable storage medium, storing a computer program, the computer program, when executed by a processor, implementing the traffic scheduling method according to claim 1.

11. A traffic scheduling method, applied to a headend node, the traffic scheduling method comprising:
- receiving a segment routing traffic engineering (SR-TE) path scheduling group delivered by a controller, the SR-TE path scheduling group at least comprising one SR-TE path with a scheduling priority being a highest scheduling priority;
- matching, in a case of receiving a service flow that needs to be scheduled, service flows that meet a preset condition;
- guiding, if the SR-TE path scheduling group only comprises one SR-TE path with the scheduling priority being the highest scheduling priority, the matched service flows to the SR-TE path with the scheduling priority being the highest scheduling priority, and maintaining a mapping relationship between the service flows and the SR-TE path; and
- otherwise, guiding, according to feature information of the matched service flows that meet the preset condition and the scheduling priority corresponding to each SR-TE path in the SR-TE path scheduling group, the service flows that meet the preset condition to the matched SR-TE path.

12. The traffic scheduling method according to claim 11, wherein, the guiding, according to feature information of the matched service flows that meet the preset condition and the scheduling priority corresponding to each SR-TE path in the SR-TE path scheduling group, the service flows that meet the preset condition to the matched SR-TE path comprises:
- screening, according to the feature information of the matched service flows that meet the preset condition and the scheduling priority corresponding to each SR-TE path in the SR-TE path scheduling group, a new service flow, received after determining the SR-TE path with a current scheduling priority being the highest scheduling priority in the SR-TE path scheduling group, from the service flows that meet the preset condition; and
- guiding the new service flow to the SR-TE path with the current scheduling priority being the highest scheduling priority, and guiding the remaining service flows to the corresponding SR-TE paths according to the previously maintained mapping relationship between the service flows and the SR-TE path.

13. The traffic scheduling method according to claim 11, wherein, the maintaining the mapping relationship between the service flows and the SR-TE path, comprises:
- establishing the mapping relationship between the service flows and the SR-TE path, and counting a flowmeter value of the service flow corresponding to the SR-TE path; and
- deleting, if the flowmeter value does not change within preset time, the mapping relationship between the service flow and the SR-TE path.

14. The traffic scheduling method according to claim 13, wherein, after the deleting the mapping relationship between the service flow and the SR-TE path, the method further comprises:
- guiding, if the service flow is received again, the service flow to the SR-TE path with the scheduling priority being the highest scheduling priority in the SR-TE path scheduling group, and maintaining the mapping relationship between the service flow and the SR-TE path with the scheduling priority being the highest scheduling priority in the SR-TE path scheduling group.

15. The traffic scheduling method according to claim 11, wherein, the maintaining the mapping relationship between the service flows and the SR-TE path, comprises:
- deleting, if a deleting notification of the SR-TE path is received from the controller, the mapping relationship between the service flow and the SR-TE path.

16. A non-transitory computer readable storage medium, storing a computer program, the computer program, when executed by a processor, implementing the traffic scheduling method according to claim 11.

17. A traffic scheduling system, comprising a controller and a headend node;
- the controller acquiring a utilization rate of preset resources in a network;
- the controller determining, according to the utilization rate, a load state of each service node on a first segment routing traffic engineering (SR-TE) path having a highest scheduling priority in a pre-created SR-TE path scheduling group;
- the controller determining, if it is determined that an overloaded service node exists on the first SR-TE path according to the load state of each service node, a second SR-TE path according to the first SR-TE path, sets a scheduling priority of the second SR-TE path to a highest scheduling priority, sets a scheduling priority of the first SR-TE path to a normal scheduling priority, and obtains an updated SR-TE path scheduling group;
- the controller delivering the updated SR-TE path scheduling group to the headend node; and
- in a case of receiving a service flow that needs to be scheduled, the headend node guiding a first service flow that meets a preset condition to the first SR-TE path, guiding a second service flow that meets the preset condition to the second SR-TE path, and maintaining a mapping relationship between the first service flow and the first SR-TE path, and between the second service flow and the second SR-TE path, wherein
- the first service flow is a service flow that is guided to the first SR-TE path before the second SR-TE path is created, and the second service flow is a new service flow received by the headend node after the second SR-TE path is created.

\* \* \* \* \*